C. B. SVENSEN.
DISMOUNTABLE AND PORTABLE PLANT FOR DIPPING SHEEP AND THE LIKE.
APPLICATION FILED DEC. 3, 1919.
1,384,168.
Patented July 12, 1921.
5 SHEETS—SHEET 1.
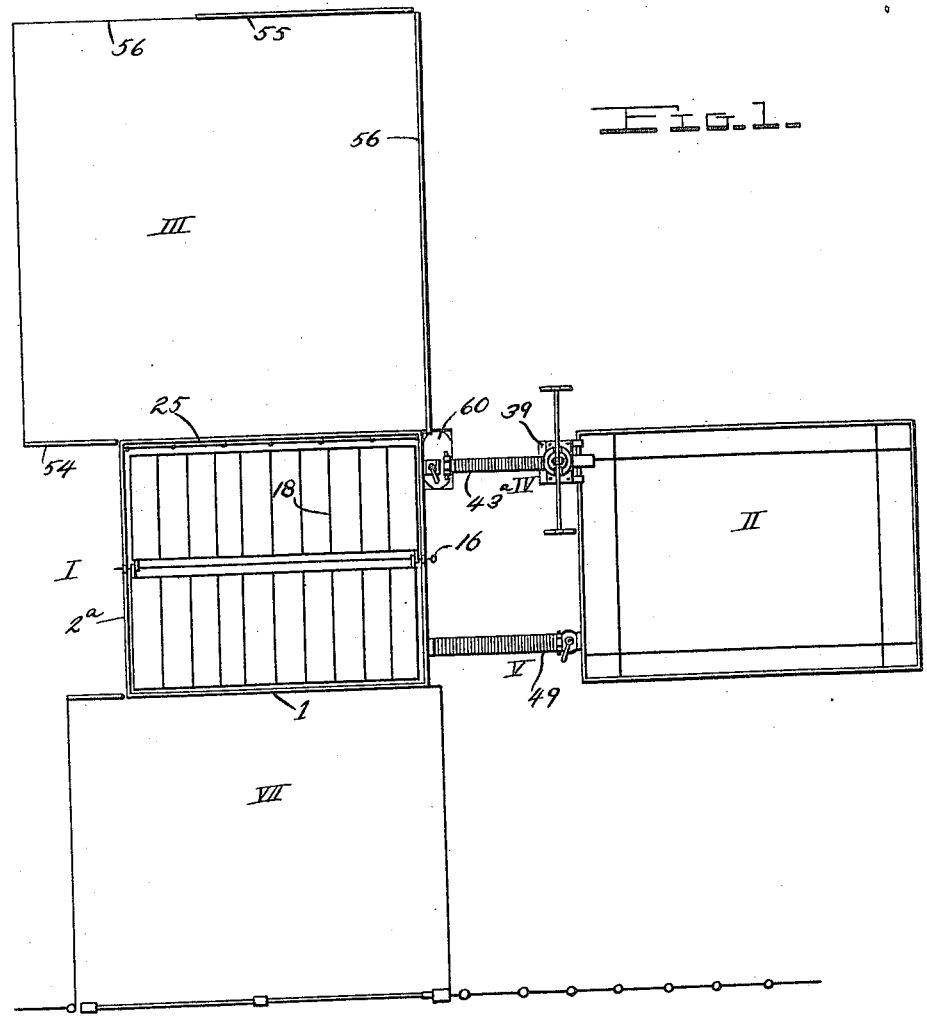

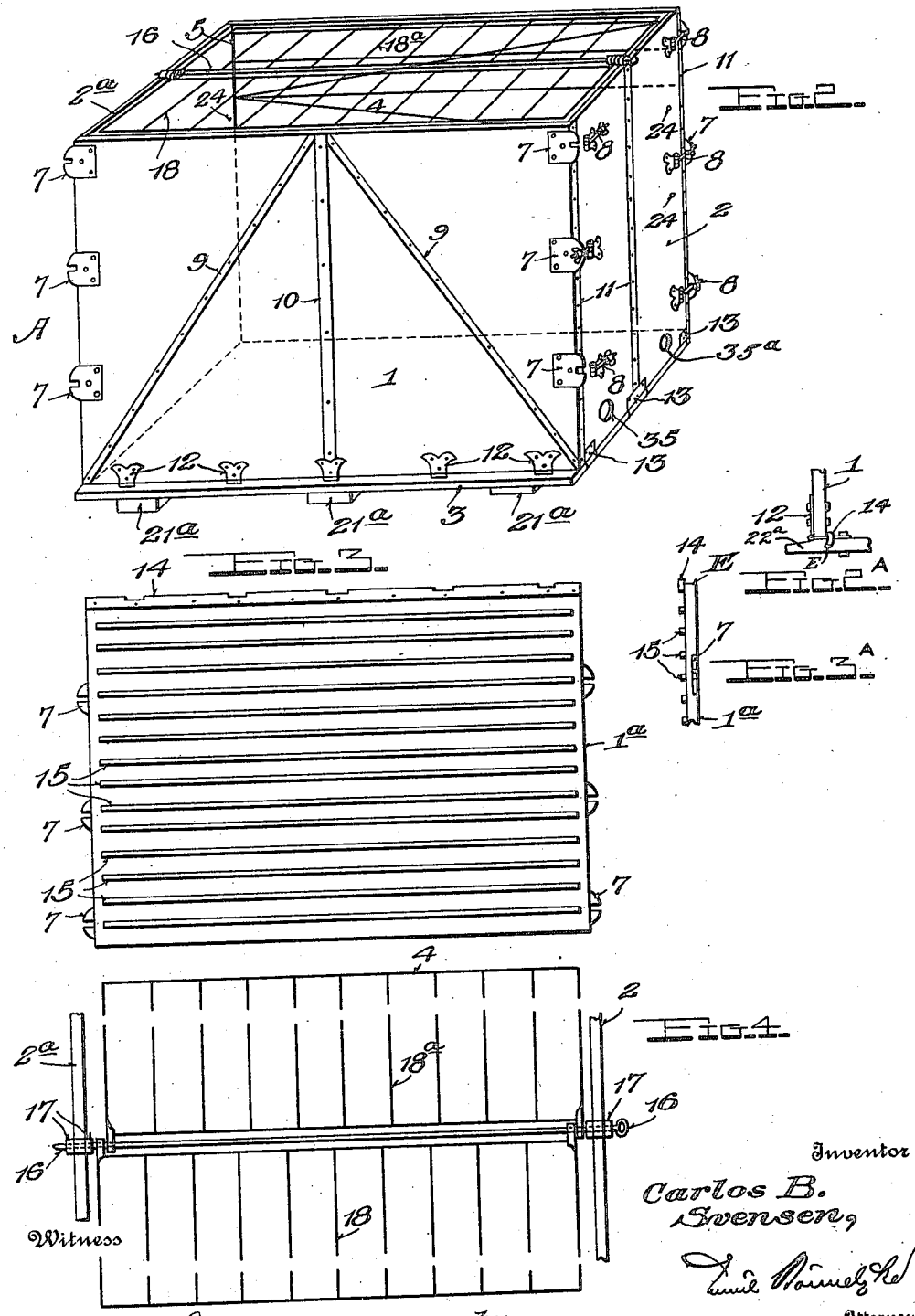

C. B. SVENSEN.
DISMOUNTABLE AND PORTABLE PLANT FOR DIPPING SHEEP AND THE LIKE.
APPLICATION FILED DEC. 3, 1919.
1,384,168.
Patented July 12, 1921.
5 SHEETS—SHEET 3.
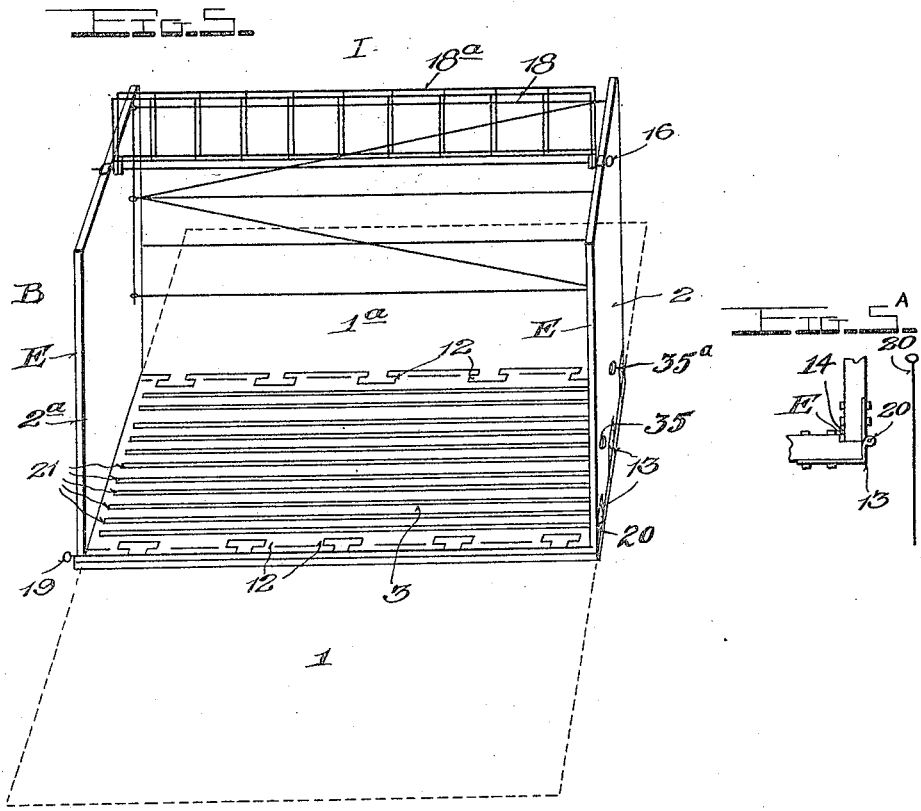
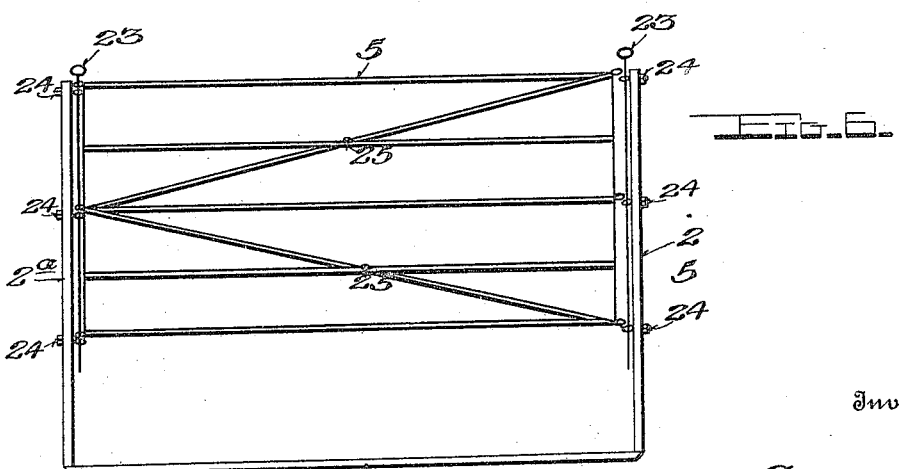

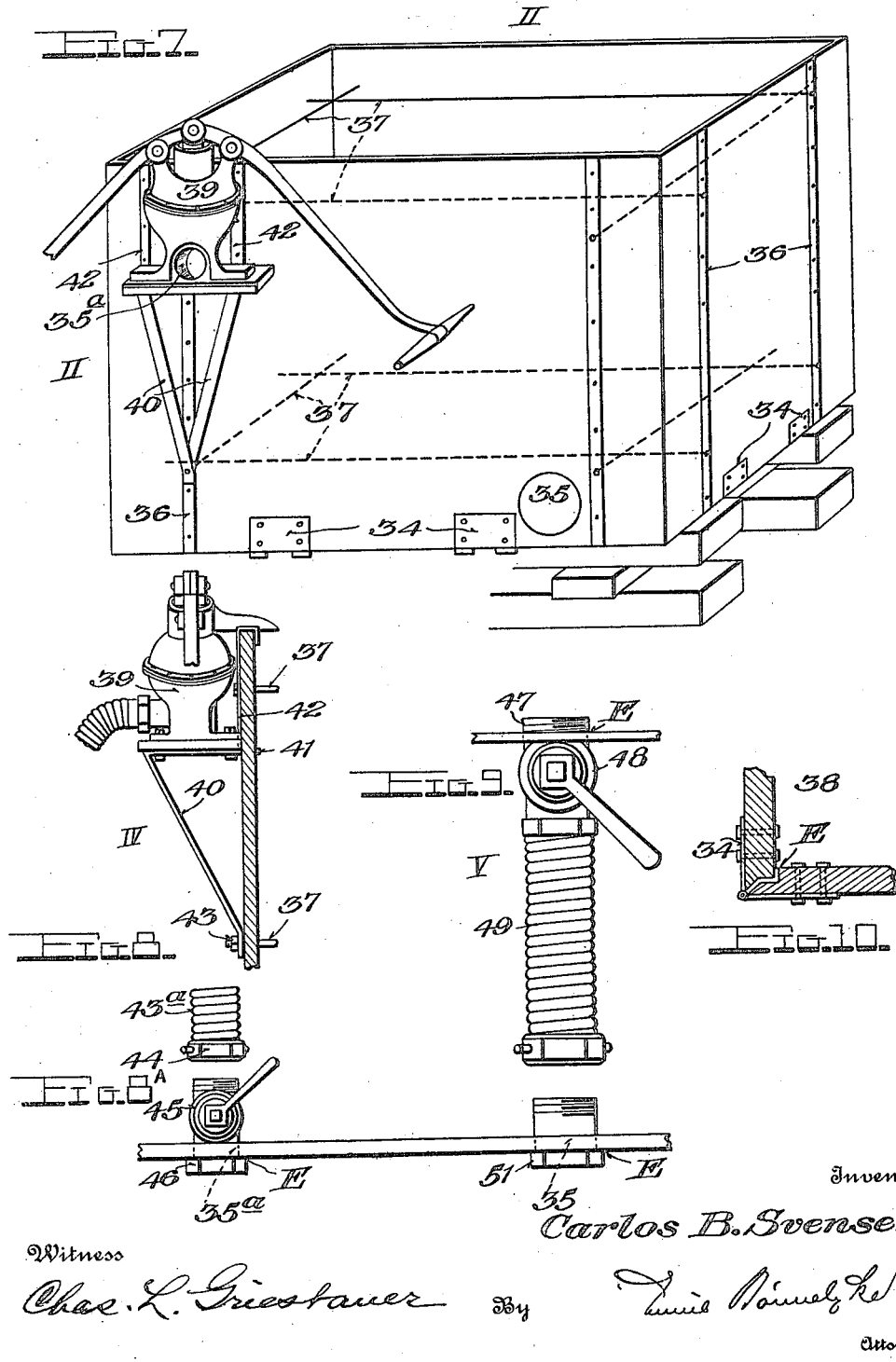

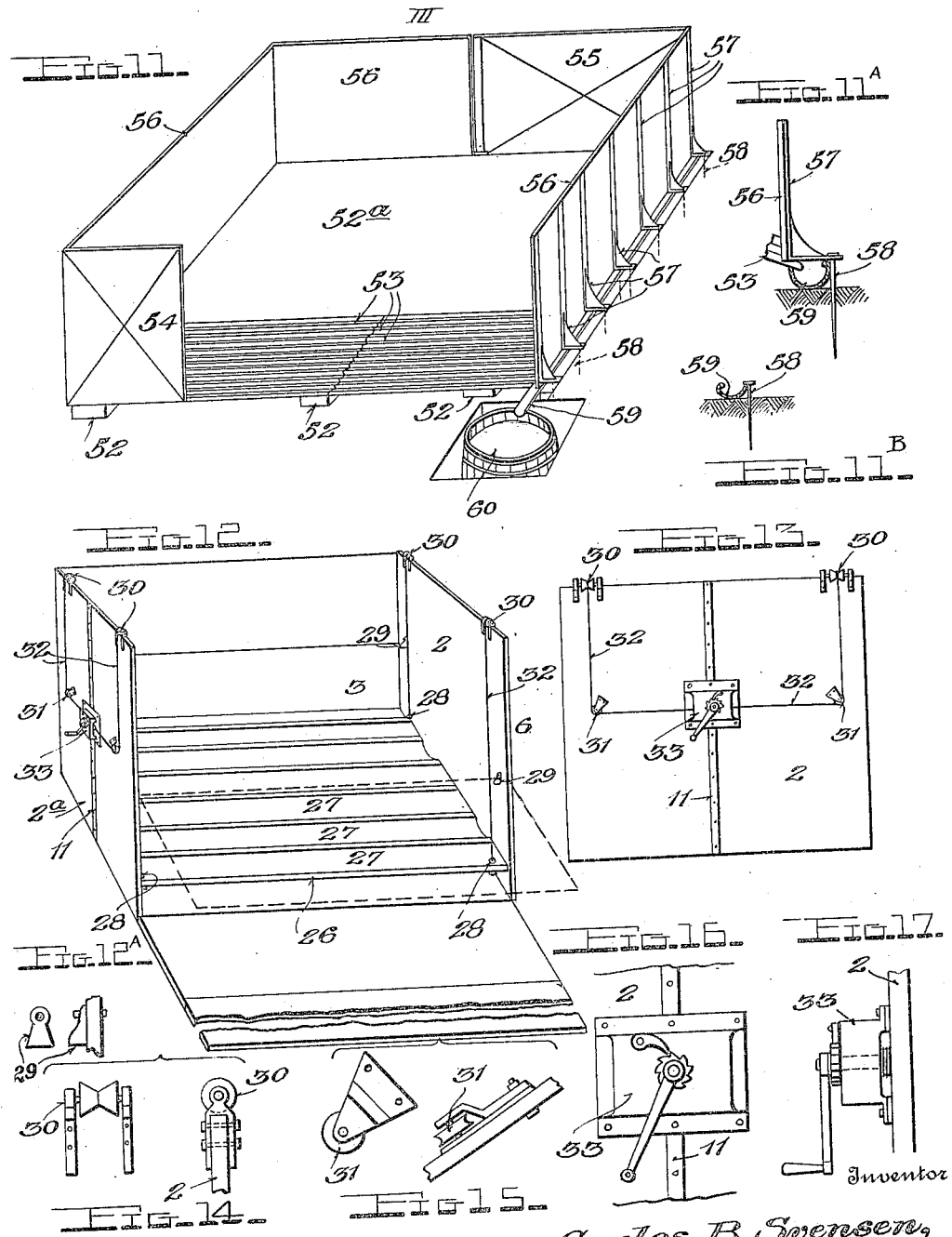

UNITED STATES PATENT OFFICE.

CARLOS BERNARDO SVENSEN, OF BUENOS AIRES, ARGENTINA.

DISMOUNTABLE AND PORTABLE PLANT FOR DIPPING SHEEP AND THE LIKE.

1,384,168.  Specification of Letters Patent.  Patented July 12, 1921.

Application filed December 3, 1919. Serial No. 342,245.

*To all whom it may concern:*

Be it known that I, CARLOS BERNARDO SVENSEN, subject of the King of Sweden, residing at Galeria General Guemes, Buenos Aires, Argentina, have invented certain new and useful Improvements in Dismountable and Portable Plants for Dipping Sheep and the like, of which the following is a specification.

This invention relates to a dismountable and portable bath or plant for dipping sheep and substantially has for object a combination of the several parts which constitute the dipping plant destined to be used for curing mange in sheep as well as for washing the wool of living sheep or that which has already been shorn off, for cleaning the wool and separating therefrom the dirt and other foreign matter clinging thereto and liable to decrease its value.

The invention also has for object a portable and dismountable sheep bath or dipping plant which comprises the several elements to be fully described in the course of this specification.

The invention also views other objects which will be referred to in the following description and particularly pointed out in the final claims hereto annexed.

In order that the invention may be readily understood and carried into practice without difficulty, a preferred form of construction of the same has been shown in the accompanying illustrative drawings, in which:

Figure 1 is a general plan view, mainly diagrammatical, of the arrangement of the several elements which constitute the dipping plant, showing the distribution thereof;

Fig. 2 is an elevation of the closed pen or box, that is, after the same has been converted into a dipping tank.

Fig. 2ª is a detail showing the connection of the hinged door to the floor of the dipping tank.

Fig. 3 is an inner view of the side walls of said box or tank, and

Fig. 3ª is a detail showing the bottom portion of the rear door of the dipping tank.

Fig. 4 is an upper plan view of said box.

Fig. 5 shows the same box or pen in its open position, to allow of the entrance of the lot of animals to be dipped and arranged, in consequence, to operate as pen properly.

Fig. 5ª is a detail showing the connection of the door with the floor of the dipping tank, and particularly the packing therefor.

Fig. 6 is a view of the false door, situated at a distance from the folding wall of the rear.

Fig. 7 is a perspective of the tank for the dipping liquor.

Fig. 8 illustrates the pump, and

Fig. 8ª is a detail showing the wall of the dipping tank with the hose connections therefor.

Fig. 9 is a detail view of the draining hose.

Fig. 10 is a detail view showing the arrangement which allows of unfolding or opening the walls of the tank of Fig. 7.

Fig. 11 is a perspective of the dripping platform.

Fig. 11ª is a detail showing the wall of the dipping pen and the draining gutter therefor.

Fig. 11ᵇ is a similar view showing only the gutter and the means for holding the same to the ground.

Fig. 12 is a perspective of a movable platform or trap, arranged for a purpose to be explained further on.

Fig. 12ª is a detail view.

Fig. 13 is an elevation of one of the side walls of said platform, and

Figs. 14, 15, 16 and 17 illustrate certain details of the means for operating the said platform.

In all the said views the same signs of reference have been used to indicate like or corresponding parts.

Referring to Fig. 1 which illustrates the general arrangement of the dipping plant, I is a pen or box, adapted to be converted into a dipping tank; II is a tank or reservoir for containing the liquor used for dipping or washing; III indicates a dripping platform onto which the sheep are caused to pass when leaving the dipping tank or bath; IV is a pump with a rubber hose, destined to drain the dipping tank I, and V indicates the valve and rubber hose for feeding the liquor into the said dipping tank. VII indicates the separating pen where the lots of animals to be dipped are conveniently separated and distributed.

The pen or box I is preferably constructed of matched wooden boards. 1 and 1ª designate the inner and outer surfaces, respectively, of the front and rear doors of the pen, of similar construction as to all their details, being provided on their outer face, on the edges of both sides, with sheets 7 of soft iron (in the case shown, there are provided three sheets on each side), said sheets being secured to the doors by means of screws or the like and being formed with a slot or opening corresponding to the outer line of the door and into which enters the screw 8 of the side wall. Said doors are reinforced by means of the braces 9 of flat iron which converge from the lower outer corners to the center at the upper part of the door. At the center and in a vertical direction is also placed a stay bar 10, all of said parts being secured together in any suitable manner by means of screws or otherwise, so as to impart to the doors the necessary degree of rigidity, required for their repeated use and to prevent any flexional stresses in the same. The said walls are connected to the bottom 3 of the pen or box by means of hinges 12. On the inner side of said walls are seen the round heads of the hinge screws and of those of the reinforcing plates or sheets, and 14 indicates an iron plate affixed to the lower inner edge by means of screws, so as to project beyond said edge, for the purpose of protecting the packing E, placed, as indicated in Fig. 5$^a$, against the wood line of the wall, provided to that end with the necessary recesses so as to fit on the inner hinge leaves, while the projecting part fits into the groove of the floor, as shown at 22.

On the said floor 3 are arranged cross battens 21 of hard wood, of suitable width, and conveniently secured in position so as to avoid slipping which is likely to occur owing to the moisture of the floor.

2 and 2$^a$ are the side walls of the pen or box, of which only the right one is provided with the necessary apertures for the passage of the rubber hose 49 and 43$^a$, for filling and draining the dipping tank; as regards the other details of construction, these are identical in both walls. 8 indicates a hinged screw which enters into the threaded hole of the plate 7, by means of which arrangement, when adjusting the wing nuts provided on said screws, the pen or box is converted into a dipping tank, rendered watertight by the packings E placed between the edges of the walls, as shown in the drawings; the packings may consist of any suitable material, such as rubber, tarred rope or simple strips of woolen fabric. 11 are metallic reinforcing plates, arranged in this case vertically on the outer side of the wall, the lateral plates coinciding with the edges of said wall. Said plates are provided for the same purpose as the plates 9 and 10 of the doors 1 and 1$^a$. The said side walls are connected to the floor by means of hinges 13, in the manner clearly shown in the detail view added to Fig. 5, and to the joint so formed, also a packing E is suitably applied.

The bottom or floor 3 of the dipping tank or pen I is also constructed of wood, being seated on wooden girders 21$^a$, the thickness of which decreases gradually from the end opposite to the hose toward the end where these latter are arranged, so as to cause the dipping liquor to flow in direction toward the hose, owing to the incline thus formed.

All the hinges of the front and rear are connected by means of an iron rod 19, provided with a handle at one of its ends and with a point at the other end, whereby the rod is inserted into the holes of said hinges to the diameter of which it corresponds. 20 indicates a rod similar to that just described, destined to enter into the holes of the hinges of the side walls.

On the front and rear walls are arranged the wooden battens 15 as shown in Fig. 3, similar to the battens 21 described with regard to the bottom or floor 3.

The upper part of the tank is formed by a fence or grate 4, destined to keep the animals confined within the tank, as quiet as possible. Said grate comprises a round iron rod 16 which, while maintaining in position the two side walls by means of the nut and lock nut 17, serves as spindle on which swing the two leaves of the grate, 18 and 18$^a$, adapted to fold till joining each other at the top, in their vertical position in which they may be locked by any suitable clamp or other fastening device. Said leaves are formed by two flat iron frames, provided with a suitable number of iron cross bars.

5 is a false door, placed at a short distance from the folding wall of the rear. Said door is approximately of a height of 90 cm. and leaves below it, near the floor, a free space of about 50 cm., the total height of the dipping tank being about 1.40 m. Said false door, as shown in Fig. 6, is constructed of a frame of flat or angle iron and suitable braces and is provided at its sides with eyes placed to coincide with the eyes 24, fastened by nuts to the walls which in order to close the door, are secured in position by the rods 23, provided with a handle, so that when withdrawing one of the said rods, the false door may swing upon the other rod either inwardly or outwardly. By means of the riveted staples 25, the door is protected against an excess of flexibility.

6 is a movable platform or trap which may be used, if desired, for accelerating the operations hereinafter to be described. The construction and shape of this platform are similar to those of the floor 3, with such restrictions as to its dimensions as may be requird by its condition of being movable within the inclosed tank, leaving at least one centimeter of clearance all around the said platform. 26 indicates the thickness of the boards forming the floor and 27 are wooden cross battens on its floor surface and similar to the battens 21, previously referred to. An eye bolt 28 secured by means of nuts to each of the four corners of said false floor serves to support and raise the floor at will. For that purpose, suitable metallic cables are secured to the said eye bolts. On the side walls, stops 29 are arranged so as to limit the elevation of the said platform or trap and 30 are grooved iron pulleys over which pass the cables by which the platform is suspended. Said pulleys are mounted on a rotating spindle mounted on iron bearings secured to the top of the side walls, at a suitable distance from the edge thereof. 31 are small sheaves suitably mounted in iron brackets placed on the outer side of the side walls for guiding said cables, at right angles to the winding devices 33 for elevating and lowering the platform, one of said devices being affixed to each of the side walls 2 and 2ª and suitable ratchet pawls and cranks having been provided for the operation of said winding or hoisting devices. These latter are secured to the walls of the tank by means of screws or other fastening means, in such a position that the central fastening screws will coincide with the reinforcement plate or sheet 11. The hoisting cable 32 will preferably be of steel.

II is the reservoir or tank for storing the dipping liquor, preferably supported on wooden girders, in the manner shown in the drawings, at a certain level above the ground; however, the foundation for the said tank may also be constructed of masonry in any suitable form. The capacity of the said tank will conveniently be double of that of the dipping pen or bath I. The four walls as well as the bottom of said reservoir may be constructed of matched wooden boards. At the lower part of said four walls are arranged the hinges 34 and in the drawings may be seen the arrangement of the recesses at the joints of the side walls and the floor or bottom.

35 and 35ª indicate the points of connection of the rubber hose used to connect the reservoir for the liquor II to the dipping tank I. 36 are flat stay bars of iron, arranged vertically at a certain distance from the corners of the tank and secured to the walls by means of screws. At a suitable distance from the lower and upper end of the bars 36, are placed cross rods 37 which extend from one wall to the opposite one and by adjusting the nuts placed on the tapped outer ends of the rods, the joints 38 with the packing E inserted therein, are pressed together, so as to render the tank watertight.

IV indicates a pump and hose used to drain the tank. 39 is the pump proper, not to be described here as the same may be of any suitable type, preferably operating with a diaphragm valve. The levers of the pump are suitably curved and elongated, in order to facilitate its operation by men standing on the ground, the pump being placed adjacent to the upper part of the tank, on one of its side walls as will later be explained. Here an explanation with regard to the capacity and yield of the pumps will be given so as to be able to appreciate the effect thereof in the arrangement of the plant, this being a factor of importance. The yield of the said pumps, of which there are two types on the market, one of ordinary and the other of improved construction, this latter of larger yield but of higher cost,—amounts to 583 liters per minute, at a height of 9 meters of suction pipe of 4 inches, and to 983 liters with a 6 inch pipe, these two being the types which have been taken into account in connection with this plant. If desired, other equivalent means may be employed but as the height at which the pumps are to operate in the plant according to this invention is less than one fourth of their elevating power, although the dimension of the pipe according to technical laws does not allow of estimating the yield by multiplication of results for the said reason, an accelerated operation of the pumps may allow of attaining a yield of 700 to 1000 and even 1100 liters per minute, this being the amount taken into consideration in the present estimate, the pumps being operated by hand by one or two men, respectively, and considering in particular in this case that this is only an intermittent work of about two minutes of duration, to be repeated every six or seven minutes.

40 indicates flat iron bars conveniently shaped so as to form a shelf to support the pump which is conveniently secured in position, in the manner illustrated in the drawings. 41 are the screw threaded ends of the bars 40, adapted to be affixed by suitable nuts and washers to the wall of the tank. 42 are two iron plates, curved as hooks engaged at their upper ends with the edge of the tank and secured to the wall thereof by means of screws, so as to conveniently support a wooden board which serves to support the pump, in conjunction with the frame formed by the aforesaid bars 40. The lower ends of the bracket or frame formed by the bars 40 converge at 43, being secured to the rod 37 by means of a nut.

43ª is the suction hose and 44 is a nut by means of which the hose is secured to the tapped part of the valve 45 which at the same time serves as regulating cock. 46 is an iron nut by means of which the valve casing is connected to the wall and E indicates the packing applied thereto.

V is a valve and feed pipe of rubber and 47 is an iron nut which supports on the inside the valve or cock 48, provided with the necessary packing E. 49 is a rubber hose and 50 a coupling by which the same is connected to the orifice 35 of the dipping tank I. 51 is a threaded connecting or coupling piece secured to the opening 35 with an inner nut and packing E.

The dripping box or platform is shown at III. Said compartment consists of a floor provided with corrugated galvanized iron sheets 52ª and walls 56 which may be formed of ordinary wire netting and provided with two doors. The size of this pen may be chosen as deemed convenient; in the scale represented, the dimensions are three meters in width by six meters in length. 52 are wooden girders arranged below the platform or pen and to which are secured by means of screws the said sheets 52ª for which they serve as foundation. In order to obtain a suitable incline for causing the dripping liquor to collect at the point where it is to be drained off by a draining pipe, the thickness of said girders decreases gradually toward the point where the orifice of said draining pipe is arranged. On the corrugated iron sheets, small battens 53 are secured, for the purpose of preventing the animals from slipping out or skidding. The side walls are provided with two doors 54 and 55, the former serving as entrance door to the dripping pen, while by the latter the stock is caused to leave the same. The walls of the dripping pen III may be formed of wire fencing supported by means of iron standards 57 to which the wire netting may be conveniently secured. The said standards are curved and provided with suitable reinforcement pieces in order to hold and protect the collecting pipe or gutter 59 for the dripping liquor, below the horizontal curve thus formed by them. 58 indicates suitable hooks in the form of hooded spikes used to fasten the collecting pipe 59 below the edge of the sheets which form the floor of the pen. Said hooks are arranged at suitable intervals and at a convenient level so as to facilitate the discharge of the dripping liquor from said collecting pipe or gutter into the main collecting reservoir 60. The collecting pipe 59 is preferably constructed of zinced or galvanized iron and of suitable dimensions to enable the same to collect and carry off all the liquor which collects on the floor of the pen. The upper outer end of the said pipe is closed, while its other end discharges into a reservoir 60 of any suitable kind and capacity, such as a cask introduced into the ground.

The separating pen or box VII for distributing and separating the animals to be dipped, is simply formed by two sections of wire netting or fencing which inclose the doors or gates of the yard before which the above described dipping plant is mounted, as well as the door 1 of the dipping box or tank; this separating pen may be of any suitable size and form, so that a detailed description of the same is not required.

Having now described the construction of the dismountable and portable dipping plant in accordance with this invention, I shall now proceed to explain the operation thereof.

The several parts being mounted in position in accordance with the foregoing description and as shown in the drawings, the tank II is charged with dipping liquor. Two manners of performing this operation have been found most convenient, as thereby an intimate and profitable mixture of the water with the curing compound, either liquid or in powder, is obtained. The first of said methods consists in converting the box or pen into bathing tank I, then mixing in said tank I the water and the ingredient in the required proportion and thereupon pumping the mixture into the tank II. The other method consists in using the dripping platform for spreading thereon the water and compound to be employed which will then flow by the pipe 58 to the reservoir 60 from which the liquor may directly be pumped into the tank II. Both of these methods have been found most convenient, not only because they allow of performing the operation without much labor, but also because the work may be effected from the ground. Thereupon, the doors 1 and 1ª of the dipping tank I are opened or lowered, so as to convert the tank into a box or pen, the false door 5 being closed, for the purpose of deceiving the animals and inducing them to enter into the box; on the other hand, the plant being in operation with a lot of animals always standing on the dripping platform, the sheep when seeing their companions through the grate of the false door, will follow their natural inclination to join their fellows and will therefore readily enter into the pen or box. After the pen is charged with a suitable number of animals, according to the size and conditions of same, the wall or door 1 is closed by securing the same to the side walls by means of the pieces 7 and the bolts 9, the door 1ª being simultaneously closed in the same manner; thereupon, the steadying grate 4 is lowered, after which the feed valve V may be opened, so as to cause the dipping liquor to enter and fill the tank to the required level, that is, till the animals are entirely covered thereby, except their heads which may conveniently be cured by hand, by applying the liquor by means of a brush or otherwise. The duration of the dip will be fixed as deemed convenient and in accordance with the curing compound used.

The dipping operation being completed, the pump for draining the tank is operated and after having exhausted all the liquor which will require from one to three minutes, the door 1ª and the false door 5 are opened and the steadying grate 4 is raised whereupon the animals will jump onto the dripping platform which they will do without necessity of stimulation. After thus treating a first lot of animals, the door 1ª will be left open, while the false door 5 will be closed and the front door 1 lowered for the entrance of a fresh lot of animals, of which a sufficient number will always be kept ready in the separating pen. From time to time, a suitable number of animals (not all) sufficiently dripped, are allowed to issue from the dripping platform or pen, so that a fresh lot of dipped sheep may enter and the animals may move with some freedom. In order to prevent the liquor from overflowing from the reservoir 60 when this latter has become filled, the draining hose 43ª is disconnected from the valve 45, which has particularly been arranged for performing this operation, and the liquor is then pumped from the reservoir 60 into the tank II.

Having now described the operation of the dipping plant in accordance with this invention, I shall proceed to explain the utility and manner of operation of the movable platform 6 which, as before stated, is a most convenient completing accessory, having for object to considerably reduce the time required for draining the dipping tank, an advantage not to be disdained when having to deal with large amounts of stock.

For applying the movable platform 6 to the dipping tank I, only a slight modification is required which consists in horizontally dividing into two parts the doors 1 and 1ª at a height of about 40 centimeters, adjacent to the first staple and set screw and joining the two halves of each door by means of common strong hinges and providing a supplementary staple at the folding part left on the doors 1 and 1ª, with the corresponding set screws on the side walls; in order to avoid too steep an ascension to the pen or box (inconvenient for the conduction of the animals) which purpose might also be obtained by the arrangement of a spring board or bridge which of course would somewhat complicate the construction of the plant, I preferably sink the dipping tank into the ground, by providing an excavation of suitable depth, with sufficient room for the connection of the hose 43ª and 49, the reservoir 60 being placed at a suitable distance away so as to avoid having to sink the same at too great a depth; the pipe 49 will preferably be provided with a discharge branch with a bend to facilitate its removal from the tank I. The folding part will be provided with a small plate similar to the lower fast edge 14, without openings or recesses, to protect the packing to be applied to this supplementary joint.

The said auxiliary or movable platform 6 has for object to avoid, in each operation of charging and draining the tank, the handling of a volume of liquor corresponding to a level of 40 centimeters, which permanently remains below the trap, said volume of liquor corresponding approximately to the level occupied by the legs of the sheep; therefore, the volume of liquor to be moved is only that which corresponds to the space occupied by the bodies of the animals and the spaces left therebetween.

The manner of operating the movable platform 6 in connection with the dipping tank is most simple. In order to charge the pen or box with animals, the movable platform is raised up to the stops 29 by winding the cable on the winding devices provided therefor, which are then locked in position by the ratchet pawl connected thereto. After the box has been filled with animals and the set screws used to convert the box into a tank having been tightened, the platform 6 is lowered by the winding devices until it rests on the floor, whereupon to the liquor already existing within the tank, the necessary additional liquor is pumped thereinto from the tank II, by means of the feed hose, till it attains the required level.

The dipping operation having been completed, the platform is raised again by simultaneously operating the respective winding devices, until the platform strikes against the stops 29, whereupon the dipping tank is drained till it leaves the platform 6 free from liquor. The cycle of operations has thus been completed and the animals are withdrawn from the tank in order to treat a fresh lot thereof, in the manner above set forth.

It will be evident that several modifications of construction and detail may be introduced into the above embodiment of the dipping plant, without departing from the limits of this invention, as clearly set forth by the claims annexed to this specification.

I now declare that what I claim as new and desire to secure by Letters Patent, is:

1. A portable and dismountable animal dipping plant comprising in combination, a dipping pen having a floor, side walls hinged to the floor, front and rear doors hinged to the floor; clamping means on the side walls and end doors coöperating to hold the same together to form a tank; means for rendering the tank watertight; a false door adjacent the rear door; folding grates at the top of the tank to confine the animals within the tank; and means for filling the tank with liquid and draining the liquid from the tank.

2. A portable and dismountable animal dipping plant comprising in combination, a dipping tank having a floor, hinged sides, hinged end doors, and means for holding the sides and doors together to form a watertight tank; a false floor mounted in said tank to be raised and lowered therein; and means for raising and lowering said false floor.

3. A portable and dismountable animal dipping plant comprising in combination, a dipping tank having a floor, hinged sides, hinged end doors, and means for holding the sides and the doors together to form a watertight tank; a false floor mounted in said tank to be raised and lowered therein; and means located on the outside of the tank for raising and lowering said false floor.

4. A portable and dismountable animal dipping plant comprising in combination, a dipping tank having a floor, hinged sides, hinged end doors, and means for holding the sides and the doors together to form a watertight tank; a dipping liquid tank located adjacent the dipping tank; a hose to carry the liquid from one tank to the other tank; and a pump for forcing the liquid through said hose.

5. A portable and dismountable animal dipping plant comprising in combination, a dipping tank having a floor, hinged sides, hinged entrance and exit doors, and means for holding the sides and doors together to form a watertight tank; a dripping pen in juxtaposition to said dipping tank and having an opening adjacent the exit door of said tank; and a reservoir for the liquid collected by the dripping pen.

6. In a portable and dismountable animal dipping plant, the combination of a collapsible dipping tank into which the animals are led before parts of the tank are brought together to confine the animals therein; a collapsible dipping liquid storage tank; a dripping pen in juxtaposition to the dipping tank and having a door adjacent the dipping tank through which the animals pass from the dipping tank to the dripping pen; and a reservoir for the liquid collected by the dripping pen.

7. In a portable and dismountable animal dipping plant, the combination of a separating pen; a dipping pen in juxtaposition to the separating pen having an entrance door and an exit door and a dripping pen in juxtaposition to the dipping pen and having an opening adjacent the exit door of the dipping pen through which the animals pass from the dipping pen to the dripping pen, the floors of separating pen, the dipping and the dripping pen being in substantially the same horizontal plane.

8. In a portable and dismountable animal dipping plant, the combination of a dipping pen having an entrance door and an exit door; a dripping pen in juxtaposition to said dipping pen and located in line with the exit door thereof so that when the exit door of the dipping pen is open the dripping pen can be seen through the dipping pen so that animals in the dripping pen will lure the animals about to be dipped, into the dipping pen; and a false door for trapping the animals in the dipping pen in their attempt to pass to the dripping pen, the floors of separating pen, the dipping pen and the dripping pen being in substantially the same horizontal plane.

In testimony whereof I affix my signature in presence of two witnesses.

CARLOS BERNARDO SVENSEN.

Witnesses:
RODOLFO RAMIREZ,
JOHN W. CONNELLY, Jr.